United States Patent
Serov et al.

(10) Patent No.: US 10,826,109 B2
(45) Date of Patent: Nov. 3, 2020

(54) GRAPHENE MATERIALS WITH CONTROLLED MORPHOLOGY

(71) Applicants: Alexey Serov, Albuquerque, NM (US); Plamen B Atanassov, Santa Fe, NM (US); Nalin Andersen, Albuquerque, NM (US)

(72) Inventors: Alexey Serov, Albuquerque, NM (US); Plamen B Atanassov, Santa Fe, NM (US); Nalin Andersen, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 594 days.

(21) Appl. No.: 14/900,697

(22) PCT Filed: Jul. 1, 2014

(86) PCT No.: PCT/US2014/045007
§ 371 (c)(1),
(2) Date: Dec. 22, 2015

(87) PCT Pub. No.: WO2015/002925
PCT Pub. Date: Jan. 8, 2015

(65) Prior Publication Data
US 2016/0130148 A1 May 12, 2016

Related U.S. Application Data

(60) Provisional application No. 61/992,732, filed on May 13, 2014, provisional application No. 61/841,756, filed on Jul. 1, 2013.

(51) Int. Cl.
*H01M 10/0525* (2010.01)
*B01J 21/18* (2006.01)
*C01B 32/184* (2017.01)
*H01M 4/36* (2006.01)
*B01J 37/08* (2006.01)
(Continued)

(52) U.S. Cl.
CPC ......... *H01M 10/0525* (2013.01); *B01J 21/18* (2013.01); *C01B 32/184* (2017.08); *H01M 4/362* (2013.01); *B01J 23/40* (2013.01); *B01J 23/56* (2013.01); *B01J 23/8926* (2013.01); *B01J 35/0013* (2013.01); *B01J 37/084* (2013.01);
(Continued)

(58) Field of Classification Search
None
See application file for complete search history.

(56) References Cited

PUBLICATIONS

Dou et al. ; Enhanced Reversible Lithium Storage in a Nanosize Silicon/Graphene Composite; Electrochemistry Communications; 12, 303-306; 2010.*

(Continued)

*Primary Examiner* — Guinever S Gregorio
(74) *Attorney, Agent, or Firm* — Gonzales Patent Services; Ellen M. Gonzales

(57) ABSTRACT

Novel non-planar non-contiguous graphene structures and novel methods for forming the same. According to some embodiments the novel methods result in three-dimensional graphene structures. According to a further embodiment these three-dimensional graphene structures have a specific, controlled morphology. According to a still further method the novel method results in decoratable graphene sheets or three-dimensional graphene structures.

15 Claims, 11 Drawing Sheets

(51) Int. Cl.
  *B01J 35/00* (2006.01)
  *B01J 23/40* (2006.01)
  *B01J 23/89* (2006.01)
  *B01J 23/56* (2006.01)

(52) U.S. Cl.
  CPC ...... *C01B 2204/02* (2013.01); *C01B 2204/04* (2013.01)

(56) References Cited

PUBLICATIONS

Huh et al.; 3D Macroporous Graphene Framework for Supercapacitors with High Energy and Power Densities; ACS Nano; vol. 6, No. 5; 4020-4028; 2012.*

* cited by examiner

GRAPHENE MATERIALS WITH CONTROLLED MORPHOLOGY

CROSS-REFERENCE TO RELATED APPLICATIONS

The following application claims benefit of U.S. Provisional Application Nos. 61/841,756, filed Jul. 1, 2013 and 61/992,732, filed May 13, 2014, each of which is hereby incorporated by reference in its entirety.

BACKGROUND

Materials formed from pure carbon come in a variety of different allotropes, depending on how the carbon elements are arranged in the material. Specifically, carbon atoms bonded together in a tetrahedral lattice arrangement are referred to as diamond, carbon atoms bonded together in spherical, tubular, or ellipsoidal formations are referred to as fullerenes, and carbon atoms are bonded together in 3-dimensional sheets of a hexagonal lattice are referred to as graphite. Single sheets of graphite are referred to as graphene.

Graphene is desirable because the two-dimensional nature, and therefore high availability of carbon atoms, results in a highly reactive material. Materials formed from graphene sheets are thus highly sought after for use as supports and materials in a variety of applications, including, but not limited to, electro- and heterogeneous catalysis, nano-electronics, supercapacitors, lithium-ion batteries (LIB), etc. However, current methods for forming and decorating graphene sheets are difficult, time-consuming, and expensive.

The most common method for forming graphene sheets uses chemical-vapor deposition to deposit a single layer of carbon atoms onto a copper metal plate after which the single graphene layer is then lifted off. See e.g., Zhu et al., Adv. Mater. 2010, 22, 3906-3924, which is hereby incorporated by reference. However, graphene multi-stacks formed from this method cost more than 3000 USD/kilogram as of 2014. Furthermore, currently available graphene materials are provided only as flat, smooth, platelets without any surface defects. However, many current and desired applications require that the surface of the graphene material be decorated with various elements. Most decoration techniques require some type of anchor or surface "defect" for the element to be attached to. Unfortunately, because the previous methods of producing graphene result only in flat, smooth, defect-free platelets, which are not amenable to decoration.

Finally, the current morphological limitation of flat platelets significantly limits the number of applications in which graphene can be used, as the flat platelets are not necessarily desirable for all potential uses.

As stated above, the 3D graphene materials described herein are suitable for use in a variety of applications including as supports in electro- and heterogeneous catalysis, in nano-electronics, as anodes in lithium-ion batteries, and in super-capacitors. Of particular interest is their application as anodes in lithium-ion batteries. Traditional lithium-ion batteries typically use graphene sheets as their anode. However, the long and thin nature of the graphene sheets hinders battery performance in two ways: first, during the charging process, the lithium ions have to travel all the way to the outer edges of the graphene sheet before they can enter and come to rest between the sheets; second, this long and slow travel often results in aggregation and therefore clogging of ions at the edges of the material. Furthermore, graphene anodes can only accommodate one lithium ion for every six carbon atoms. Accordingly, in order to overcome these limitations, current research has focused on either replacing the graphene anodes with silicon, which can accommodate four lithium ions for every silicon ion, or combining the two. However, silicon dramatically expands and contracts during the charging process, causing fragmentation and rapid loss of charge capacity.

Accordingly, new cost-effective methods of producing decoratable graphene sheets and multi-stacks of graphene sheets with controlled morphology, including non-flat morphologies would be highly beneficial to a wide variety of industries.

SUMMARY

The present disclosure provides a novel method for forming graphene sheets and graphene multi-stacks. According to some embodiments the novel method results in three-dimensional graphene structures. According to a further embodiment these three-dimensional graphene structures have a specific, controlled morphology. According to a still further method the novel method results in decoratable graphene sheets or three-dimensional graphene structures.

DETAILED DESCRIPTION

Figure 1:
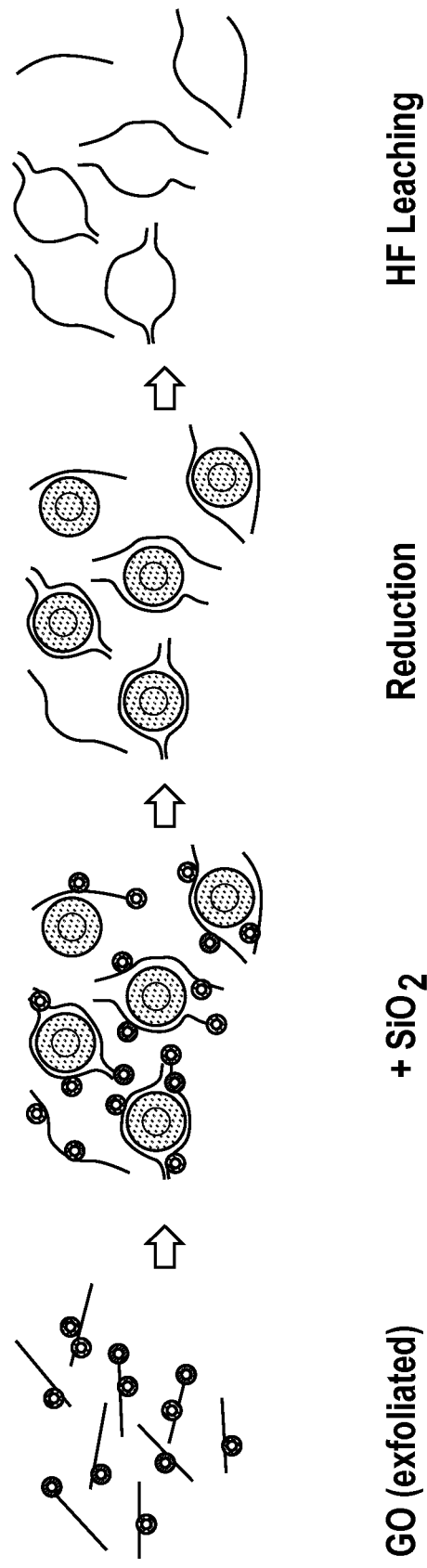
FIG. 1 is a schematic illustration of the steps of a method for producing 3D graphene structures according to an embodiment of the present disclosure.

According to an embodiment the present disclosure provides a novel method for forming graphene sheets and graphene multi-stacks. According to some embodiments the novel method results in three-dimensional graphene structures. According to a further embodiment these three-dimensional graphene structures have a specific, controlled morphology. According to a still further method the novel method results in decoratable graphene sheets or three-dimensional graphene structures.

For the purposes of the present disclosure the term mono-layer graphene is used to refer to a flat, 2-dimensional sheet, or platelet, formed from a single layer of carbon atoms arranged in a hexagonal pattern. A graphene "multi-stack" or "few-layer graphene" is formed from multiple individual layers of graphene sheets stacked on top of each other. As an analogy, a graphene mono-layer might be thought of as a sheet of paper, a graphene "multi-stack" (or few-layer graphene) as several sheets of paper stacked on top of each other. For the purposes of the present disclosure, anything with a thickness of greater than 50 graphene layers will be considered graphite, while 50 or fewer graphene layers is considered graphene. Accordingly a graphene structures may have a thickness of 50 or fewer layers, 20 or fewer layers, 10 of fewer layers, 6 or fewer layers, 3 or fewer layers, 2 or fewer layers, or only 1 layer of graphene.

A three-dimensional (3D) graphene structure according to the present disclosure is a non-planar graphene structure. Accordingly, while a 3D mono-layer graphene structure may be seen as a single contiguous sheet or multiple layers of contiguous sheets of paper crumpled, folded, bent, or otherwise manipulated to form a three-dimensional structure, the present disclosure also contemplates and describes the de-novo construction or synthesis of 3D structures having one or more voids that are defined and separated by graphene walls and wherein the walls of the structures are formed from fewer than 50 layers of graphene. It is important to note that, in this embodiment, the walls and overall structure are not formed from a manipulated pre-formed single contiguous sheet (or stack of sheets), and, in fact, in "non-contiguous" embodiments, the overall structure could not be "unrolled," or "uncrumpled," in order to form a single contiguous sheet (as distinguished from, for example, carbon nanotubes, which if unrolled, would form a single contiguous sheet).

For the purposes of the present disclosure a "graphene wall" is a section of hexagonally arranged carbon atoms that forms the physical structure of the final non-contiguous material. According to some embodiments the graphene wall may consist of a single-layer of hexagonally arranged carbon atoms or fewer than 3, fewer than 6, fewer than 10, fewer than 20 or fewer than 50 layers of single-layer sheets. As explained in more detail below, some or all of the graphene walls in a particular embodiment may be more "string-like" in appearance. However, unlike the graphene sheets that have been previously described, which are simply flat platelets, some or all of the graphene sheets or walls (and/or portions thereof) formed by the methods described herein may be curved, rounded, or otherwise non-planar in shape. Furthermore, various walls may branch or connect with other walls to form the complex 3D morphology described herein. Accordingly, it will be understood that while the wall in general may be referred to as having a specific thickness (i.e., 1, 5, or 10 layers of graphene sheets) some or all of the wall junctions i.e., regions where one or more "walls" connect, may be viewed as having a greater thickness, even though the general structure is considered to have an overall wall thickness of the 1, 5, or 10 layers, based on the thinnest section of the wall.) Accordingly, for the purposes of the present disclosure, the thickness of a particular graphene wall is determined by the area in which the least number of carbon atoms can be measured, (i.e., the thinnest portion of the wall). According to some preferred embodiments, the graphene walls may have a thickness of between 6 and 10 graphene layers. It will be understood that while no particular wall will have a thickness of more than 50 layers, because the structure may contain many walls and many voids, the overall structure itself may have a much, much larger diameter.

According to an embodiment, the present disclosure utilizes a sacrificial-template based method to synthesize 3D graphene materials. An example of this method is shown in FIG. 1. In general, graphene oxide, which in some embodiments may take the form of exfoliated graphene oxide, is mixed with or dispersed on the surface of a sacrificial template material and exposed to suitable conditions (i.e., reduction) to enable the formation of one or more graphene layers around the sacrificial template material, thereby producing three-dimensional graphene layers, wherein the morphology of the 3D structure is a direct result of the size and shape of the sacrificial template material. Once the 3D graphene layer or layers are formed, the sacrificial material is removed using means suitable for the specific sacrificial template material being used. The result is a 3D structure formed of graphene material having a specific desired morphology. Specifically, the 3D structure comprises graphene or graphene multistack walls forming one or more voids, where the voids are produced by the space that had previously been occupied by the sacrificial template material.

It will be understood that because the size and morphology of the sacrificial template material determines the specific morphology of the resulting 3D graphene structure, specific care can be taken to select the sacrificial template material that will produce the desired final product. It will be understood that the density, number, and shape of the voids and thickness and shape of the walls can all easily be controlled, enabling the formation of a wide variety of 3D graphene materials ranging from dense rigid structures to amorphous flexible structures and anything in between. According to some embodiments, it may be desirable to produce a highly complex 3D structure resulting in a very large surface area contained within a small volume. This can be achieved, for example, by producing a highly tortuous 3D structure having a large number of convoluted curves, folds, caves, etc. Alternatively or additionally, it may be desirable for this 3D structure to include graphene walls forming specifically-sized or shaped pores or compartments in which other materials can reside. As a further alternative, it may be desirable to form very open soft mesh or rigid scaffold-like structures where the graphene material is more similar to thin strings or netting. Any or all of these high levels of complexity can be achieved by selecting the size and shape of the sacrificial support and ratio of sacrificial support to graphene oxide.

It will be appreciated that by selecting the ratio of sacrificial support particles to graphene precursor and the size, shape, and even porosity of the sacrificial template particles used, it is possible to control, select, and fine-tune the structure of the 3D graphene material. Specifically, the disclosed method enables the production of a 3D graphene material having as convoluted and tortuous a wall formation as desired. For example, a highly porous open-structure "sponge-like" 3D graphene structure may be formed by using larger sacrificial template particles, while a highly convoluted, complex internal structure may be formed by using smaller, more complexly shaped, sacrificial particles, including for example, sacrificial particles of different shapes and/or sacrificial particles which are themselves porous. Moreover, the "density" of the catalyst can be selected by altering, for example, the ratio of sacrificial particles to graphene precursor materials, the shape of the template particles (i.e. how easily they fit together), or other factors.

Figure 2:
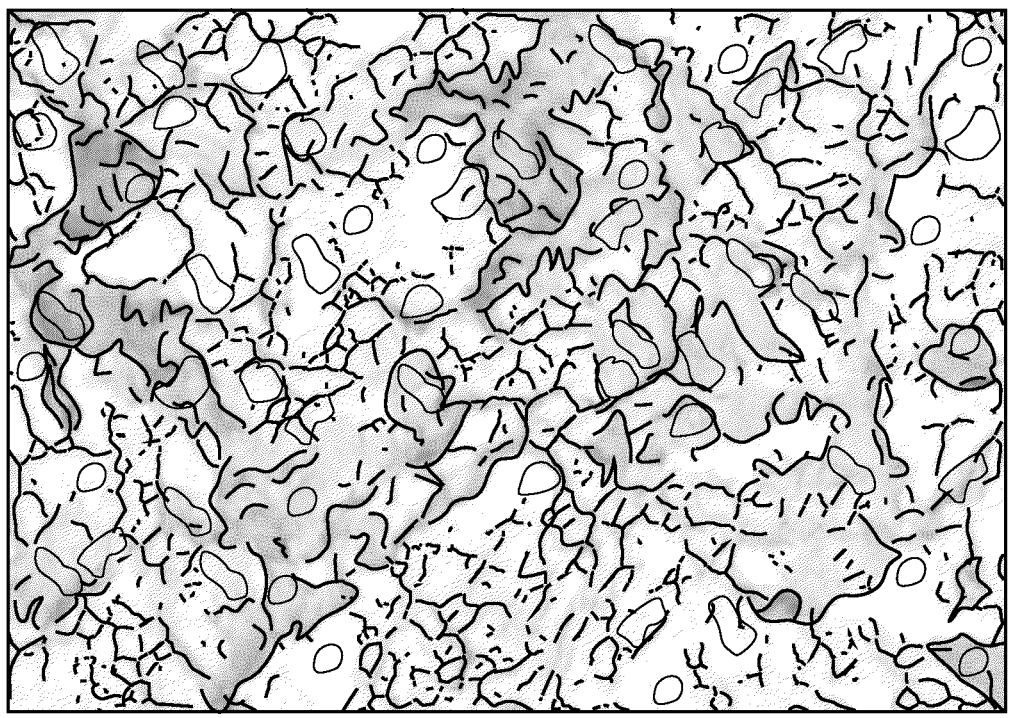
FIG. 2 is an illustration of the morphology of 3D graphene structures that can be produced using the methods disclosed in the present disclosure.

Accordingly, it will be appreciated that the size and shape of the sacrificial support particles may be selected according to the desired shape(s) and size(s) of the graphene walls and voids within the final product. Specifically, it will be understood that by selecting the particular size and shape of the support particles, one can produce a 3D material having walls and voids of predictable size and shape. For example, if the template particles are spheres, the 3D material will contain a plurality of spherical voids having the same general size as the spherical particles. For instance, assuming there is no alteration in the size of the particle caused by the synthesis method, in an embodiment where particles having an average diameter of 20 nm is used, the spherical voids in the catalyst will typically have an average diameter of approximately 20 nm (Those of skill in the art will understand that if the diameter of the particle is 20 nm, the internal diameter of the void in which the particle resided will likely be just slightly larger than 20 nm and thus the term "approximately" is used to account for this slight adjustment.) FIG. 2 is a schematic illustration of a 3D graphene material we were able to form using spherical template particles and the methods described herein. (See also FIGS. 8-10 and Examples section below.)

According to an embodiment, the type of sacrificial support and ratio between sacrificial support and graphene oxide determines the number of graphene layers formed on top of the sacrificial template. For example, our experiment have shown that using sacrificial support with spherical particles in the range on 300 nm enables the formation of 1-2 layer graphene walls, while having amorphous silica with particle size 30 nm formed graphene walls consisting of between sheets 4 and 6 layers of graphene. Accordingly, by precisely controlling the ratio between sacrificial support and graphene oxide, one can precisely select the number of layers of graphene (or overall "thickness") the final 3D product.

Accordingly it will be understood that the sacrificial support particles may take the form of any two- or three-dimensional regular, irregular, or amorphous shape or shapes, including, but not limited to, spheres, cubes, cylinders, cones, etc. Furthermore, the particles may be monodisperse, or irregularly sized.

It will be further understood that because the 3D graphene materials are formed using a sacrificial support technique, where the sacrificial material can be, for example, "melted" out of the supporting materials using acid etching or other techniques, the resulting material can be designed to have a variety of variously shaped internal voids which result in an extremely high internal surface area that is easily accessible. Furthermore, because the size and shape of the voids is created by the size and shape of the sacrificial particles, 3D materials having irregular and non-uniform voids can easily be obtained, simply by using differently shaped sacrificial particles and/or by the non-uniform distribution of sacrificial materials within the graphene oxide/sacrificial particle mixture. Furthermore, the sacrificial-support based methods of the present disclosure may produce 3D materials having, for example, a bi-modal (or even multi-modal) pore distribution either due to the use of differently sized sacrificial particles or where a first smaller pore size is the result of removal of individual particles and thus determined by the size of the sacrificial particles themselves and a second, larger, pore size is the result of removal of agglomerated or aggregated particles. Accordingly, it will be understood that the method described herein inherently produces a 3D material having a unique morphology that would be difficult, if not impossible, to replicate using any other technique.

As stated above, according to various embodiments, sacrificial particles of any size or diameter may be used. In some preferred embodiments, sacrificial particles having a characteristic length/diameter/or other dimension of between 1 nm and 100 nm may be used, in more preferred embodiments, sacrificial particles having characteristic length/diameter/or other dimension of between 100 nm and 1000 nm may be used and in other preferred embodiments, sacrificial particles having characteristic length/diameter/or other dimension of between 1 mm and 10 mm may be used. It should also be understood that the term "sacrificial particle" is used herein as a term of convenience and that no specific shape or size range is inherently implied by the term "particle" in this context. Thus, while the sacrificial particles may be within the nanometers sized range, the use of larger or smaller particles is also contemplated by the present disclosure.

According to some embodiments, the sacrificial particles may themselves be porous. Such pores may be regularly or irregularly sized and/or shaped. The use of porous sacrificial particles enables the graphene precursor material to intercalate the, producing even more complexity in the overall three-dimensional structure of the resulting catalyst.

It will be appreciated that the sacrificial template particles may be synthesized and mixed (or coated, or infused, etc.) in a single synthesis step or the graphene oxide may be mixed with pre-synthesized (whether commercially purchased or previously synthesized) sacrificial particles.

Of course it will be appreciated that given the various conditions that the sacrificial template will be subjected to during the synthesis process, it is important to select a template material which is non-reactive to the other materials used under the specific synthesis conditions used and that the removal of which will not damage the final material. Silica is a material which is known to easily withstand the conditions described herein while remaining inert to a variety of materials including the materials described herein. Furthermore, if desired, silica can be removed using techniques that also serve to produce surface defects that can be used to decorate the surface of the 3D graphene material. Thus, silica is considered to be a suitable material from which the sacrificial template particles can be made. According to some specific embodiments, 20 nm diameter spheres formed from mesoporous silica can be used. In this case the templating involves intercalating the mesopores of the silica template particles and the resulting material typically contains pores in the 2-20 nm range. In one particular embodiment, the silica template is commercially available Cabosil amorphous fumed silica (325 m²/g). Those of skill in the art will be familiar with a variety of silica particles that are commercially available, and such particles may be used. Alternatively, known methods of forming silica particles may be employed in order to obtain particles of the desired shape and/or size.

However, while many of the examples herein utilize silica for the templating materials, it will be appreciated that other suitable materials may be used including, but are not limited to, zeolites, aluminas, and the like.

Returning to FIG. 1, as stated above the graphene oxide may be exfoliated. Those of skill in the art will be well familiar with methods for exfoliating graphene oxide. The (exfoliated) graphene oxide may be mixed with or dispersed on the surface of the sacrificial template using any suitable means including, for example, by mixing the materials together in a solvent such as water and subjecting the mixture to high temperatures such as leaving the mixture at 100° C. over night. Alternatively or additionally, sufficient mixing may be obtained by energy transfer effected by means of an ultra-high power ultrasonic probe. The hybrid material is then reduced via heat treatment in order to convert the graphene oxide to graphene material. Heat treatment may be performed either in an inert atmosphere such as N2, Ar, or He, or in a reactive atmosphere such as NH3 or acetonitrile. Suitable temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred.

After heat treatment, the sacrificial template particles are removed resulting in a complex, porous, 3D graphene structure. In some cases the 3D structure consists only of graphene. Removal of the sacrificial template particles may be achieved using any suitable means. For example, the template particles may be removed via chemical etching. Examples of suitable etchants include NaOH, KOH, and HF if silica support is used, and mineral acids HCl, $HNO_3$, $H_2SO_4$ etc if MgO is used.

Figure 3:
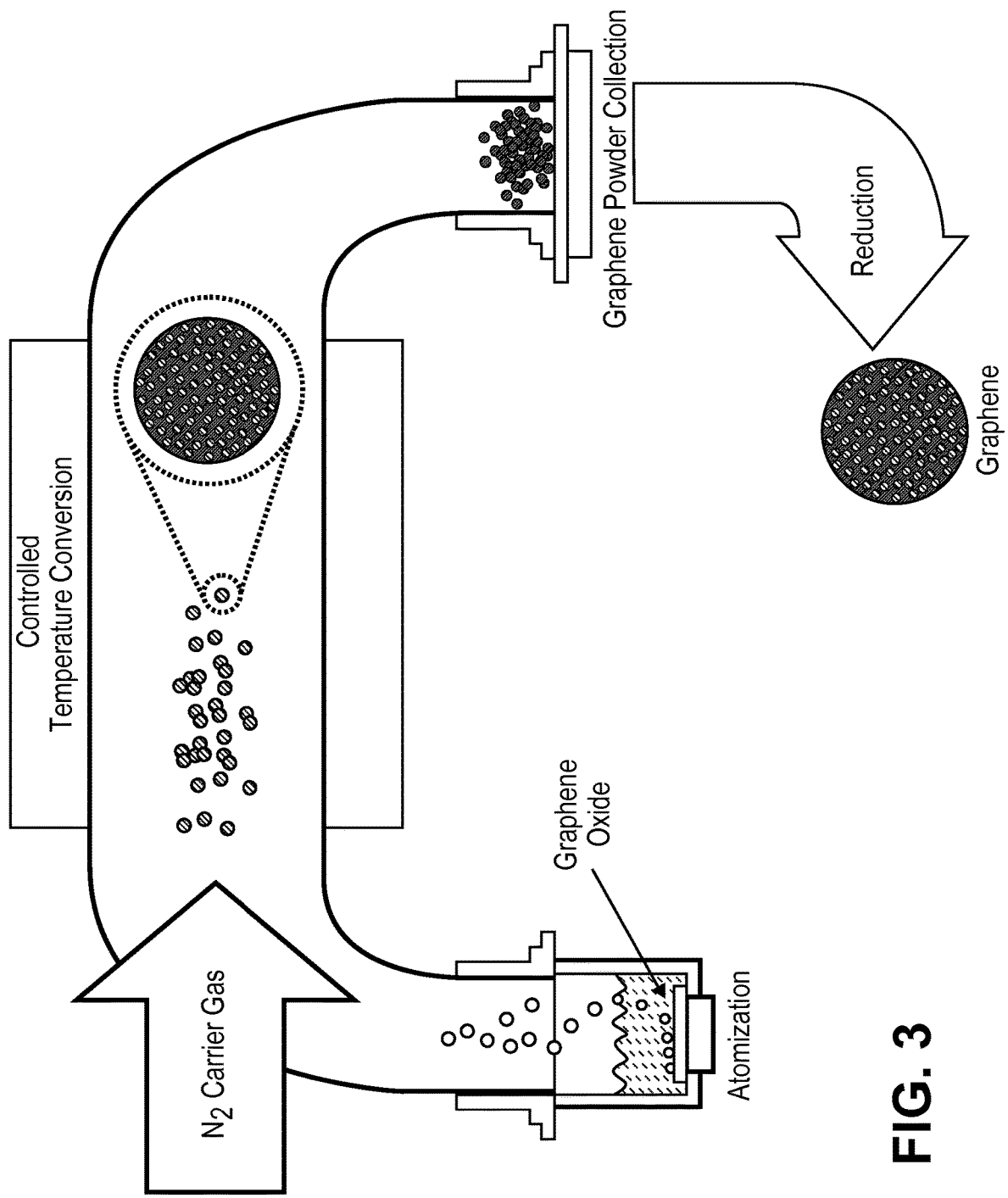
FIG. 3 is a schematic illustration of the steps of a spray pyrolysis-based method for producing graphene structures according to an embodiment of the present disclosure.

According to yet another embodiment, and as shown in FIG. 3, graphene materials may be produced by spray pyrolysis. According to this embodiment, graphene oxide is atomized, for example by use of a ultra-high power ultrasonic probe, and transported by flowing inert/reactive/reductive gas through a pre-heated furnace, thus forming graphene and graphene stack materials. The graphene materials are then collected on a filter.

Figure 4:
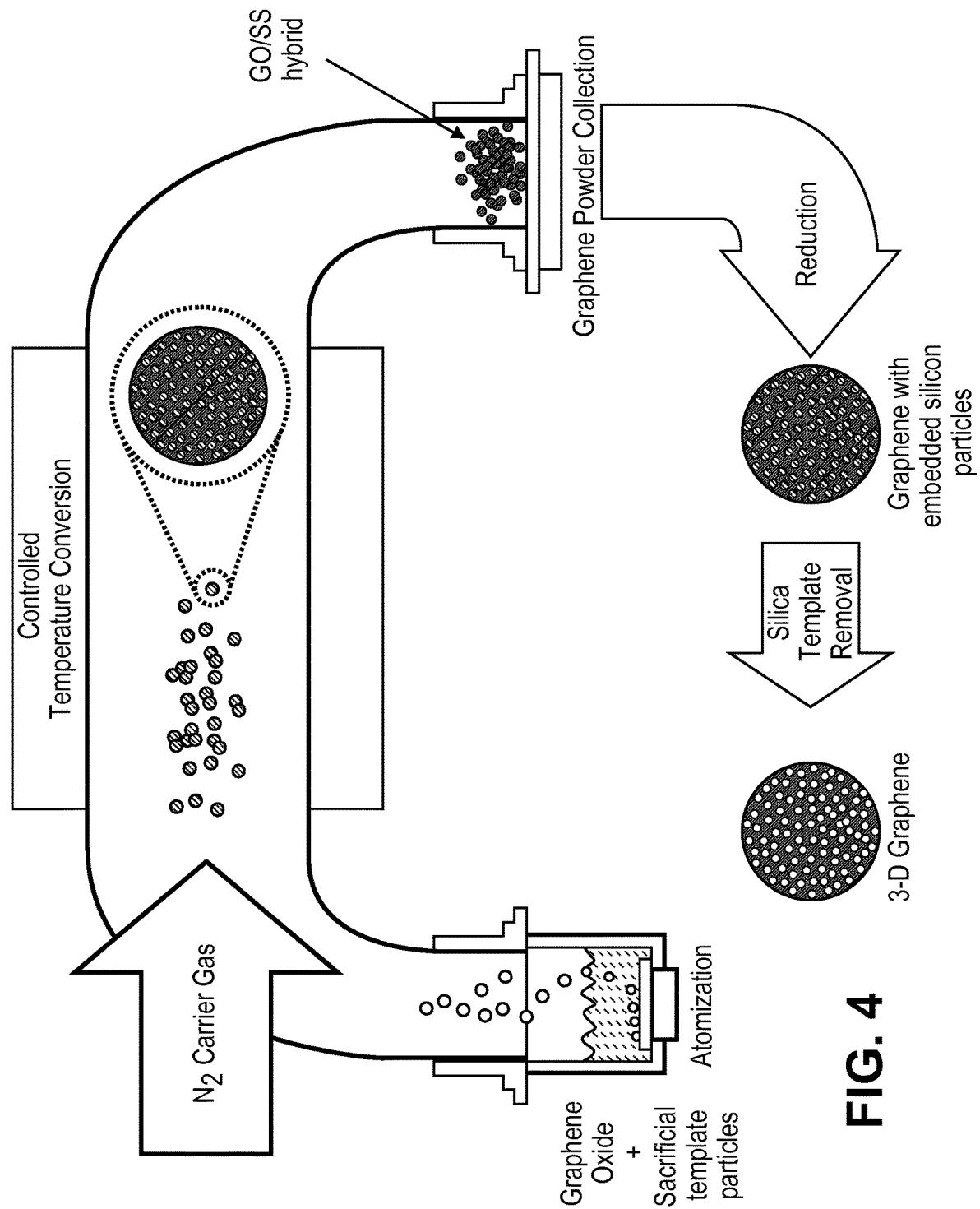
FIG. 4 is a schematic illustration of the steps of a spray pyrolysis-based method for producing 3D graphene structures according to an embodiment of the present disclosure.
Figure 5:
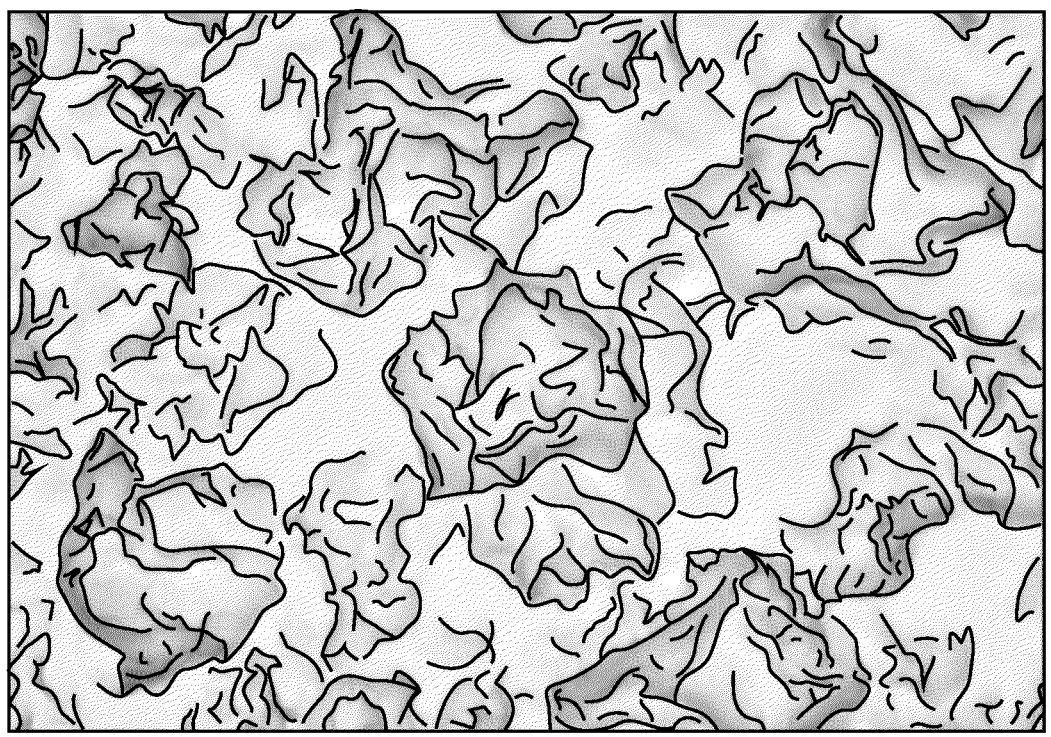
FIG. 5 is an illustration of the morphology of 3D graphene structures that can be produced using the method illustrated in FIG. 4.

According to a still further embodiment, and as shown in FIG. 4, 3D graphene structures can be formed by a combination of spray pyrolysis and the sacrificial template method described above. In this embodiment, graphene precursor such as graphene oxide is dispersed on a sacrificial support as described above with respect to the sacrificial support method, the hybrid material is then atomized, for example, by use of aultra-high power ultrasonic probe, and then transported by flowing inert/reactive/reductive gas through a pre-heated furnace. The supported graphene materials are then collected on a filter and heat treated. After heat treatment, the sacrificial support is removed, using the techniques described above. The combined spray pyrolysis/sacrificial support method offers a fast and cost-effective method for producing large amounts of 3D graphene materials. FIG. 5 is a schematic illustration of the types of structures, referred to as "graphene flowers" that we were able to produce using this technique. (See also FIGS. 10 and 11 and Examples section below.)

As stated above, the 3D graphene materials described herein are suitable for use in a variety of applications including as supports in electro- and heterogeneous catalysis, in nano-electronics, as anodes in lithium-ion batteries, and in super-capacitors. And as also previously stated, of particular interest is the application of graphene materials as anodes in lithium-ion batteries. The 3D materials described herein can be used to produce highly efficient LIB anodes. Specifically, the methods described above can be used to produce highly porous graphene structures with a high surface area to volume ratio. The morphology of these structures provides a much higher number of carbon ions for accommodation of lithium ions and enable the lithium ions to intercalate the graphene materials, reducing or eliminating the clogging problems of current graphene anodes.

Figure 6:
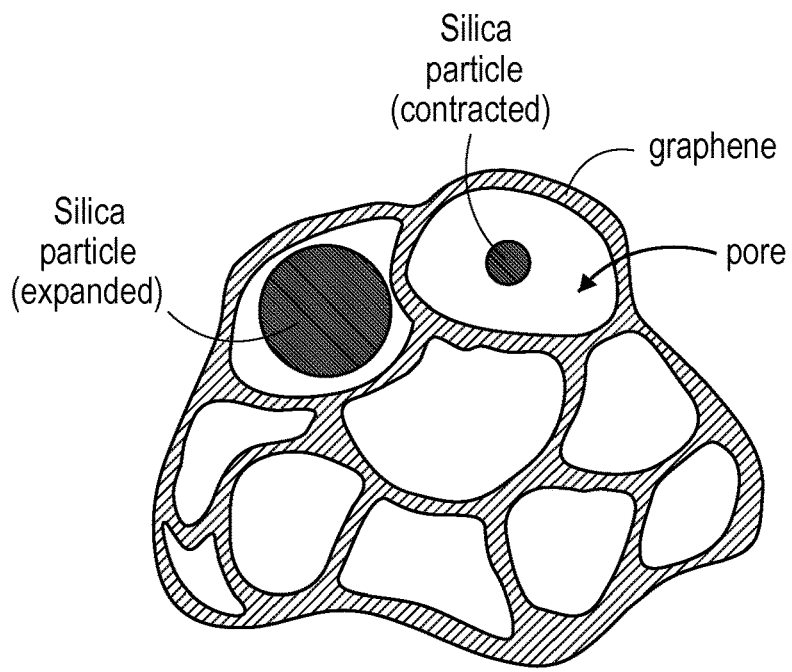
FIG. 6 is a schematic cross-section of an particular embodiment of a 3D graphene structure that can be produced using the methods described in the present disclosure.

Furthermore, the 3D materials described herein can be used to produce hybrid graphene-silica anodes as shown in FIG. 6, which easily enable silica particles to expand and contract during charging. (It will be understood that particles would likely be in either the expanded or contracted state at the same time, the particles are shown in both states in FIG. 5 solely for demonstration purposes.) Specifically, the techniques described herein can be used to produce 3D graphene material having compartments in which silica particles can be housed with sufficient space to expand. For example a 50 nm diameter silica particle may be known to expand to 150 nm during charging. Accordingly, a 3D graphene porous structure can be formed using 250 nm diameter sacrificial template particles. The resulting 3D structure would then contain a large number of ~250 nm pores, each of which would be capable of housing a 150 nm diameter silica particle—providing sufficient room for the silica particles to expand without any damage to the graphene structure, but still able to retain the contracted particles. Thereby producing a hybrid anode providing the benefits of both graphene and silica.

Figure 7:
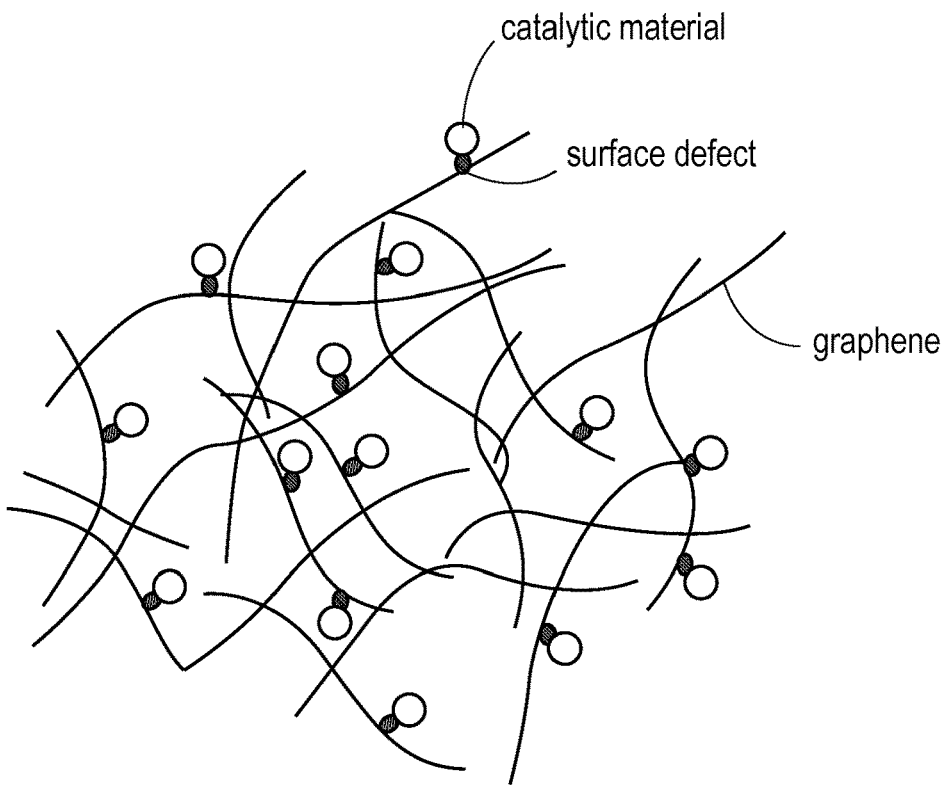
FIG. 7 is a schematic cross-section of another particular embodiment of a 3D graphene structure that can be produced using the methods described in the present disclosure.

According to yet another embodiment, the 3D graphene structures of the present disclosure can serve as supports for various types of catalysts. As stated above, and as shown in FIG. 7, the methods described herein can produce 3D graphene structures having a number of surface defects including topological defects such as pentagons, heptagons, or combinations thereof, vacancies, adatoms, edges/cracks, absorbed impurities, etc. many of which result from the removal of the sacrificial template material and which can be used as anchors or attachment points for other materials. According to some embodiments, these surface defects can be used as attachment points for catalytic materials such as Pd-based alloys (PdCu, PdBi, PdIn, PdSn, PdPb, PdSb etc), single metal particles (Pt, Pd, Rh, Ir, Ru etc), oxides, nitrides, carbides etc. Methods for attaching such materials onto the graphene structures include chemical reduction with different reducing agents, polyol method, thermal reduction, thermal decomposition etc.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. Inclusion of a reference herein is not an admittance of such reference as prior art to the present application, as publication of the reference may have taken place after the priority date of the present application.

REFERENCES

E. Antolini Appl. Catal. B. 88 (2009) 1.
G. Kucinskis, G. Bajars, J. Kleperis J. Power Sources 240 (2013) 66-79.
A. Serov, U. Martinez, A. Falase, P. Atanassov, Electrochem. Comm 22 (2012) 193-196.
A. Falase, M. Main, K. Garcia, A. Serov, C. Lau, P. Atanassov, Electrochim Acta 66 (2012) 295-301.
S. Pylypenko, S. Mukherjee, T. S. Olson, P. Atanassov, Electrochim Acta 53 (2008) 7875-7883.
M. H. Robson, A. Serov, K. Artyushkova, P. Atanassov Electrochim Acta, 90 (2013) 656-665.
S. Brocato, A. Serov, P. Atanassov Electrochim Acta, 87 (2013) 361-365
A. Serov, M. H. Robson, K. Artyushkova, P. Atanassov Appl. Catal. B 127 (2012) 300-306.
A. Serov, M. H. Robson, M. Smolnik, P. Atanassov Electrochim Acta 80 (2012) 213-218.
A. Serov, M. H. Robson, B. Halevi, K. Artyushkova, P. Atanassov Electrochem. Comm 22 (2012) 53-56.
A. Serov, U. Martinez, P. Atanassov Electrochem. Comm 34 (2013) 185-188.
A. Serov, M. H. Robson, M. Smolnik, P. Atanassov, Electrochim Acta 109 (2013) 433-439.

Examples

Formation of 3D Graphene Material

Figure 8:
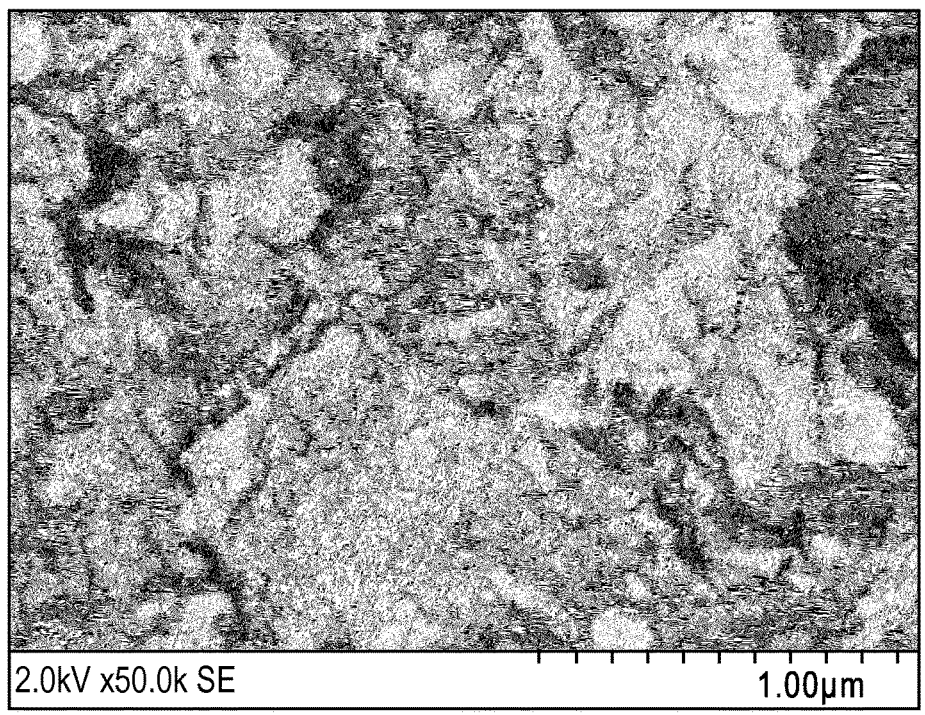
FIG. 8 is a Scanning Electron Microscope (SEM) image of a 3D graphene structure produced using the methods disclosed herein.
Figure 9:
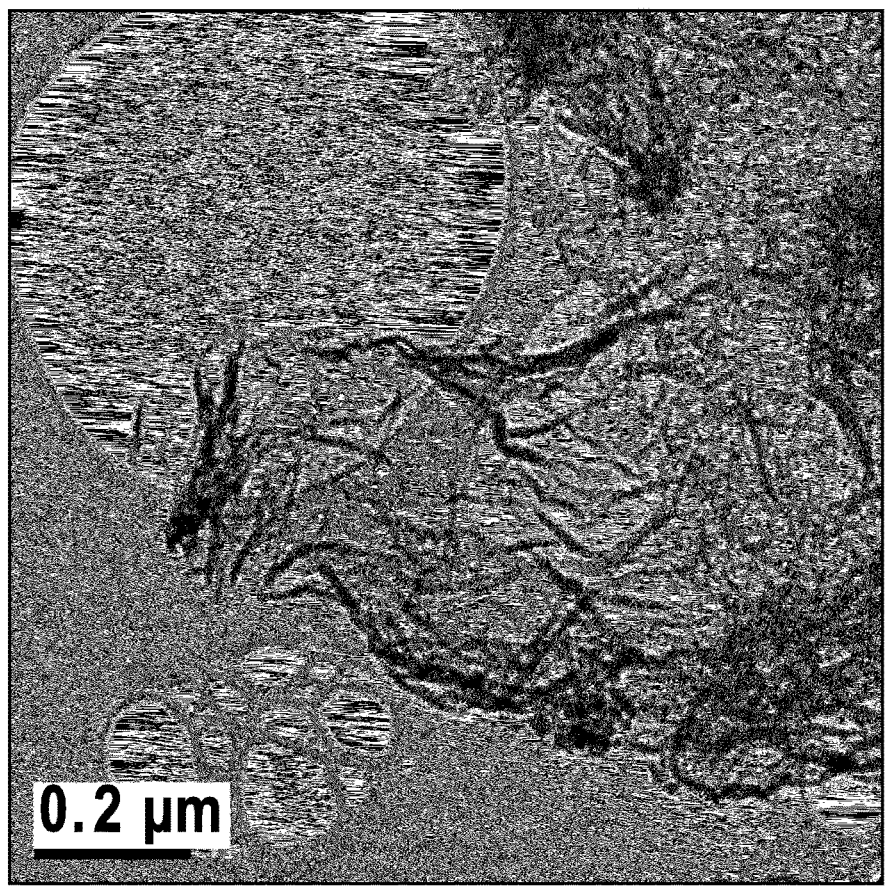
FIG. 9 is an SEM image of another 3D graphene structure produced using the methods disclosed herein.
Figure 10:
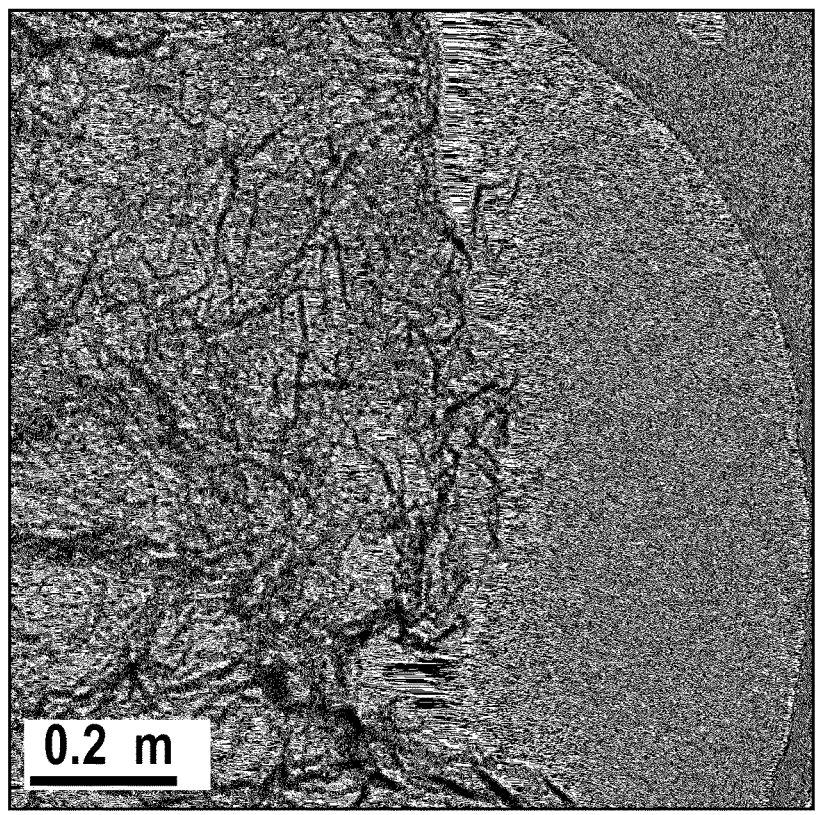
FIG. 10 is an SEM image of yet another 3D graphene structure produced using the methods disclosed herein.

Graphene oxide 13.78 g in 750 ml of DI water was fully exfoliated by means of ultra-high power ultrasonic probe (total amount of energy transferred to solution was 600 kJ). In separate plastic vial 75 g of Cabosil silica EH5 (surface area 400 $m^2$ $g^{-1}$) was dispersed in 1000 ml of water by means of ultra-high power ultrasonic probe (total amount of energy transferred to solution was 325 kJ). Two solutions were mixed together and another 325 kJ was transferred to solution. Solution was dried at T=90 C. Obtained graphene oxide/silica hybrid was reduced in $H_2$ atmosphere at T=800 C for 1 h. Silica was removed by addition of 400 ml of 25 wt % HF. 3D graphene was washed by DI water until pH=6.5. Wet powder was dried at T=85 C. FIGS. 8-10 shows SEM images of 3D graphene material formed using this method.

Formation of Graphene Nano-Flowers

Figure 11:
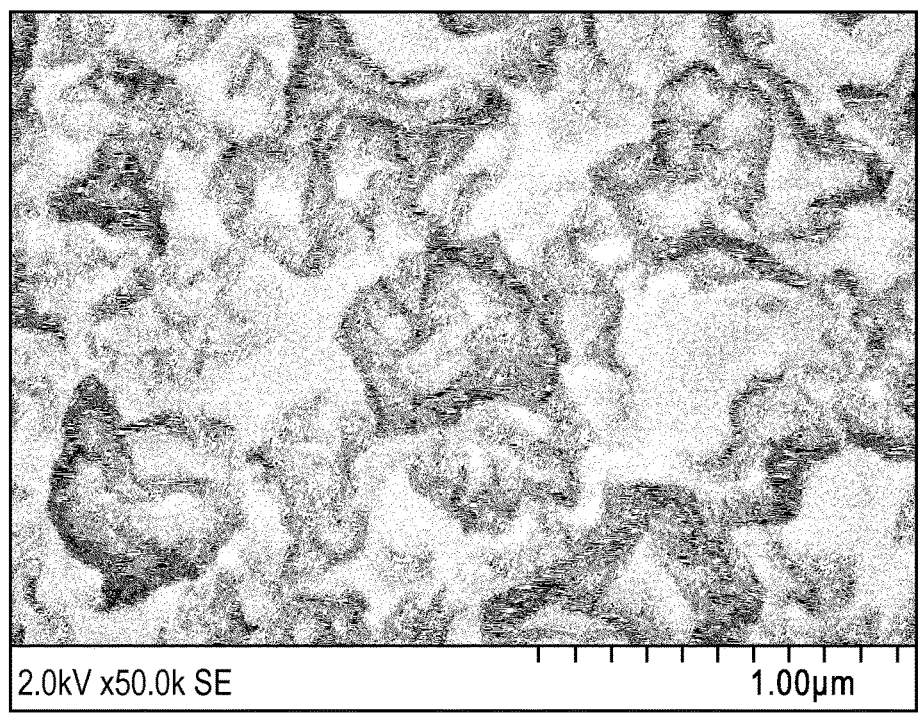
FIG. 11 is an SEM image of still another 3D graphene structure produced using the methods disclosed herein.
Figure 12:
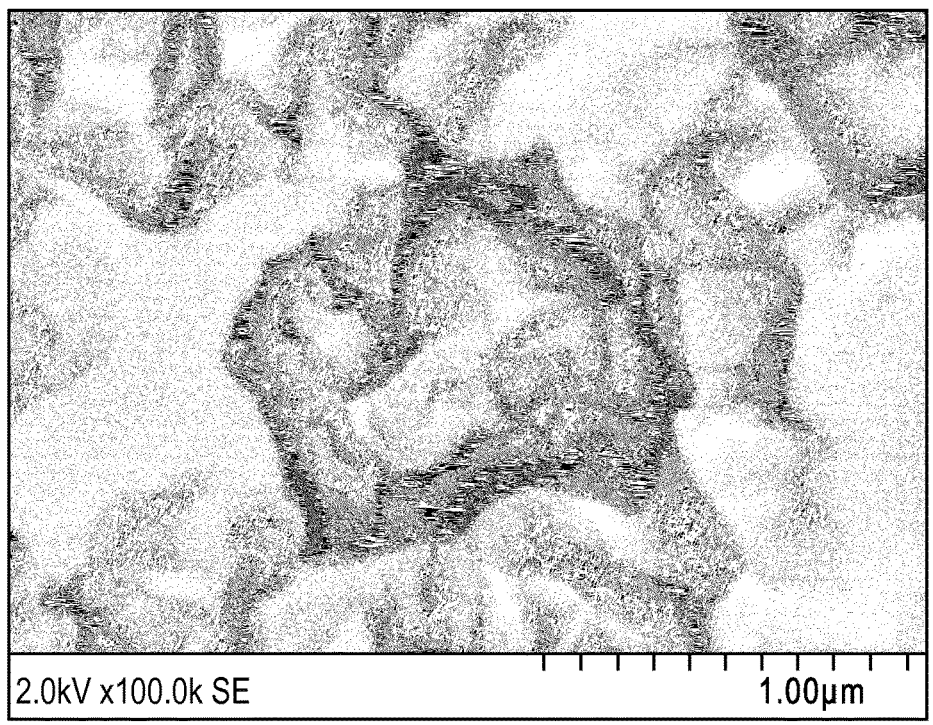
FIG. 12 is a close up of one of the 3D graphene "flowers" of FIG. 11.

Graphene oxide 7.78 g in 250 ml of DI water was fully exfoliated by means of ultra-high power ultrasonic probe (total amount of energy transferred to solution was 675 kJ). In separate plastic vial 23 g of Cabosil silica EH5 (surface area 400 $m^2$ $g^{-1}$) was dispersed in 100 ml of water by means of ultra-high power ultrasonic probe (total amount of energy transferred to solution was 215 kJ). Two solutions were mixed together and another 215 kJ was transferred to solution. Solution was placed in plastic bottle and atomized by using low energy ultrasonic bath. Aerosol droplets were transferred through pre-heated tube furnace at 1 L/min flow rate of N2. Dried powder was collected on Teflon filter in he cold end of furnace. Obtained graphene oxide/silica hybrid was reduced in $H_2$ atmosphere at T=800 C for 1 h. Silica was removed by addition of 175 ml of 25 wt % HF. Nano-flowers of graphene were washed by DI water until pH=6.5. Wet powder was dried at T=85 C. FIGS. 11-12 show SEM images of 3D graphene "nano-flowers" formed using the spray pyrolysis and sacrificial support method below.

PdCu Catalyst Supported on 3D Graphene Material

Figure 13:
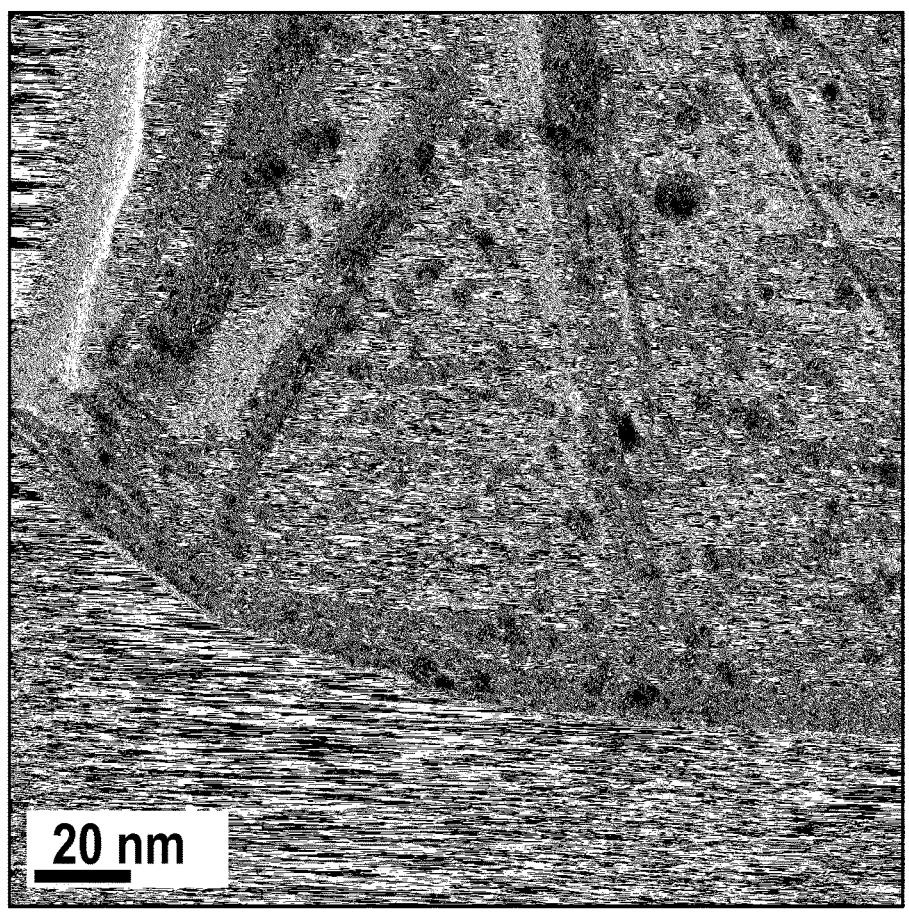
FIG. 13 is an SEM image of a decorated 3D graphene structure produced using the methods disclosed herein.
Figure 14:
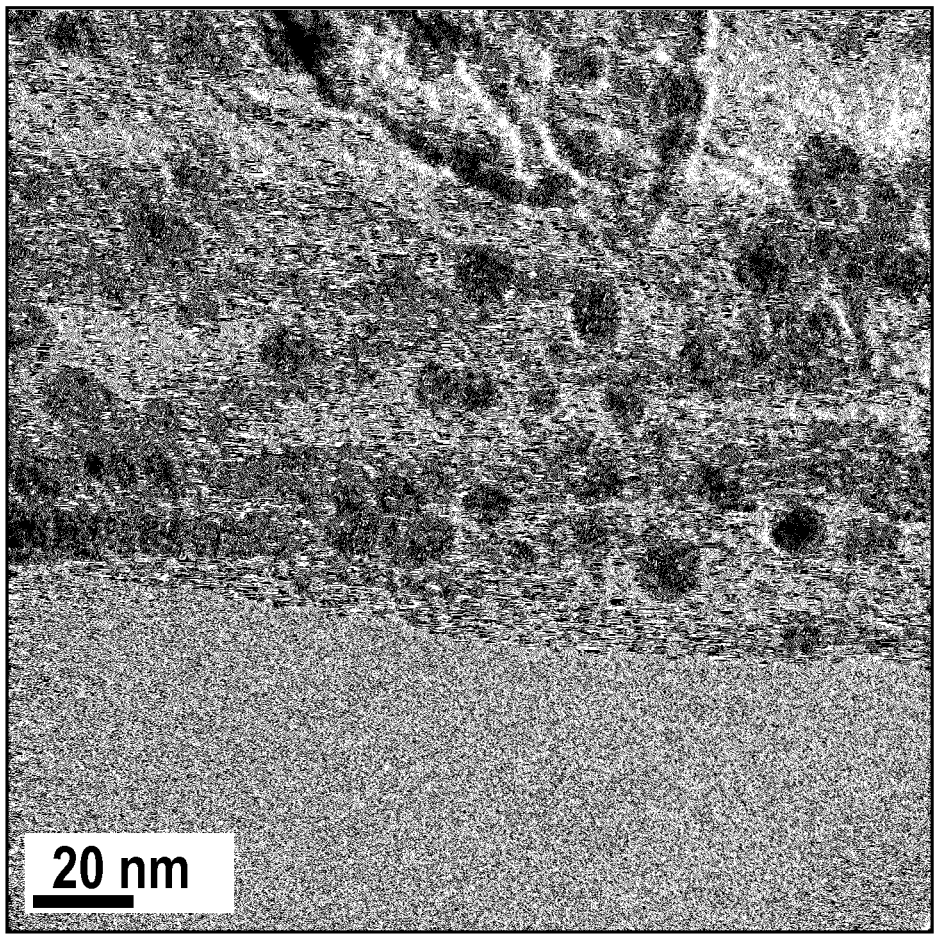
FIG. 14 is another SEM image of a decorated 3D graphene structure produced using the methods disclosed herein.
Figure 15:
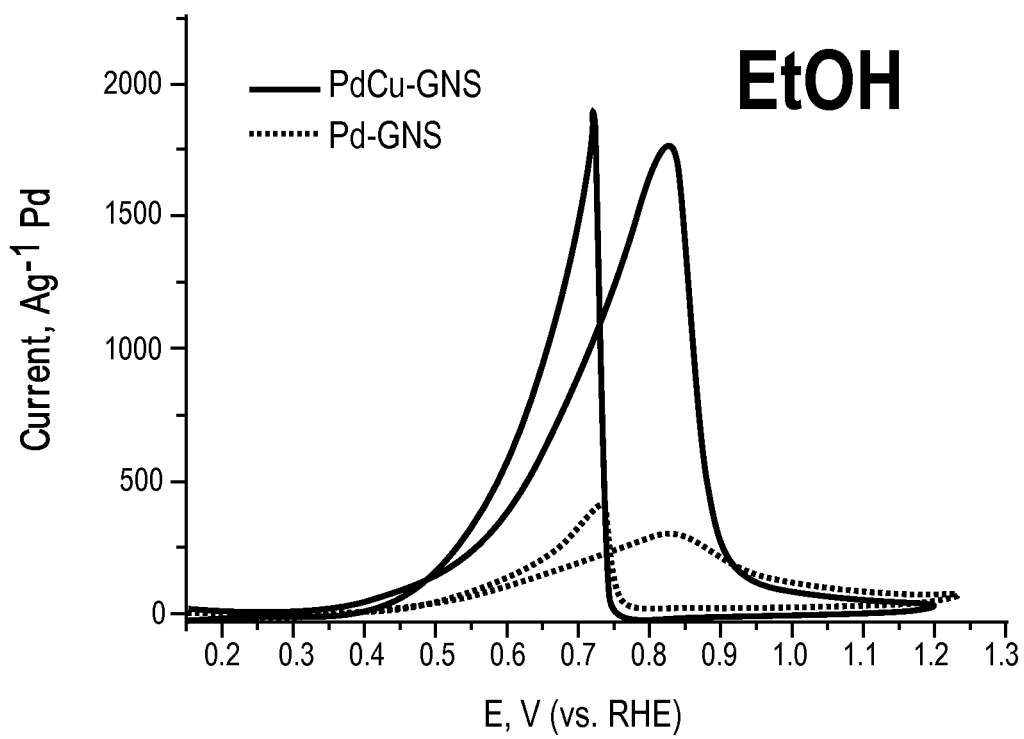
FIG. 15 is a graph showing the electrochemical performance of Pd—Cu decorated 3D graphene structures in the reactions of electrooxidation of ethyl alcohol (EtOH) in alkaline media.
Figure 16:
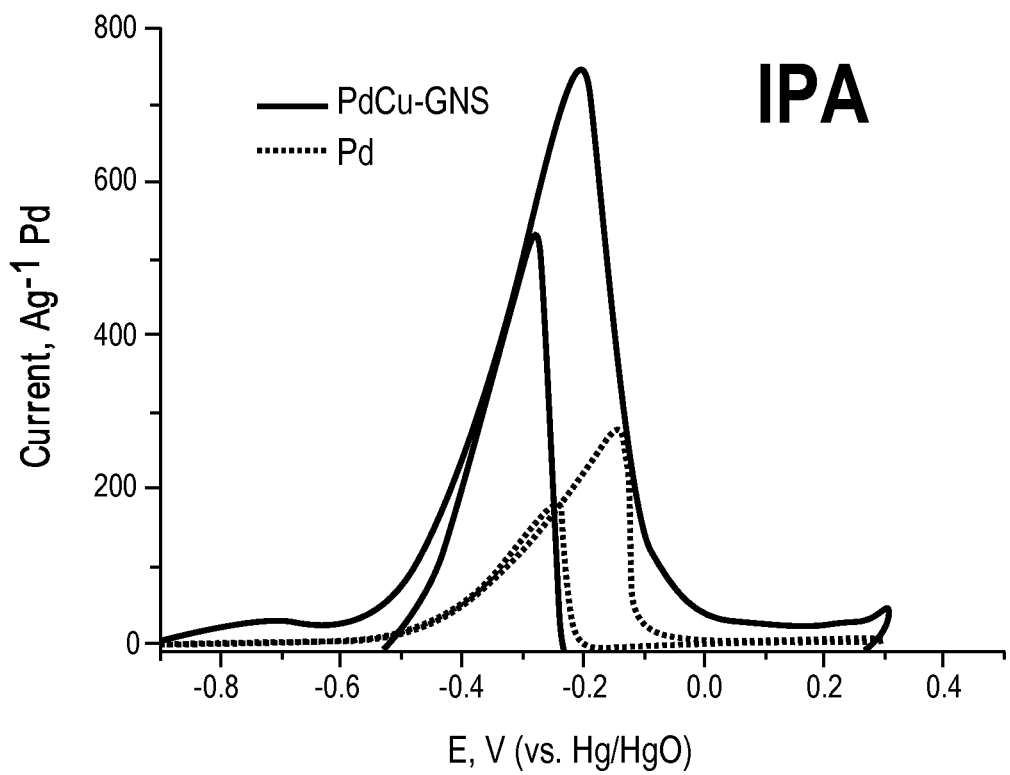
FIG. 16 is a graph showing the electrochemical performance of Pd—Cu decorated 3D graphene structures in the reactions of electrooxidation of iso-propyl alcohol (IPA) in alkaline media.

FIGS. 13-14 show SEM images of PdCu catalyst supported on 3D graphene material. FIGS. 15-16 show electrochemical performance of Pd—Cu in the reactions of electrooxidation of iso-propyl alcohol (IPA) and ethyl alcohol (EtOH) in alkaline media.

What is claimed is:

1. A three-dimensional (3D) graphene structure comprising a plurality of graphene walls surrounding a plurality of voids, wherein the voids are created by the removal of a sacrificial template material and wherein the voids result in a bi-modal pore distribution.

2. The 3D graphene structure of claim 1 wherein the graphene walls consist of a single graphene sheet.

3. The 3D graphene structure of claim 1 wherein the graphene walls consist of between 1 and 5 layers of graphene sheets.

4. The 3D graphene structure of claim 1 wherein the graphene walls consist of between 1 and 10 layers of graphene sheets.

5. The 3D graphene structure of claim 1 wherein a silicon particle is housed within at least one of the voids, wherein the diameter of the silicon particle, when fully expanded, is less than the diameter of the void.

6. The 3D graphene structure of claim 1 further comprising a plurality of surface defects.

7. The 3D graphene structure of claim 6 further comprising a catalytic material attached to the structure via the surface defects.

8. The 3D graphene structure of claim 1 wherein the graphene walls have a thickness of less than 20 graphene monolayers.

9. The 3D graphene structure of claim 1 wherein the graphene walls have a thickness of between 6 and 10 graphene monolayers.

10. The 3D graphene structure of claim 1 wherein the voids are irregular and non-uniform in shape.

11. A three-dimensional (3D) graphene structure consisting of a plurality of graphene walls surrounding a plurality of voids, wherein the voids are created by the removal of a sacrificial template material and wherein the voids result in a bi-modal pore distribution.

12. The 3D graphene structure of claim 11 wherein the graphene walls consist of a single graphene sheet.

13. The 3D graphene structure of claim 11 wherein the graphene walls consist of between 1 and 5 layers of graphene sheets.

14. The 3D graphene structure of claim 11 wherein the graphene walls consist of between 1 and 20 layers of graphene sheets.

15. The 3D graphene structure of claim 11 wherein the voids are irregular and non-uniform in shape.

* * * * *